(12) United States Patent
Dupper et al.

(10) Patent No.: US 7,024,673 B2
(45) Date of Patent: Apr. 4, 2006

(54) DRIVE SYSTEM FOR A SCANNING DEVICE OF AN INFORMATION RECORDING OR REPRODUCTION DEVICE

(75) Inventors: Rolf Dupper, Villingen-Schwenningen (DE); Reiner Baas, Steinach (DE); Günter Tabor, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 173 days.

(21) Appl. No.: 10/685,087

(22) Filed: Oct. 16, 2003

(65) Prior Publication Data

US 2004/0170111 A1    Sep. 2, 2004

(30) Foreign Application Priority Data

Oct. 22, 2002  (DE) ................................ 102 49 322

(51) Int. Cl.
*G11B 17/04* (2006.01)
(52) U.S. Cl. ...................................... 720/664
(58) Field of Classification Search ................ 720/664, 720/665; 369/219, 244, 215, 249
See application file for complete search history.

(56) References Cited

U.S. PATENT DOCUMENTS 5,777,978 A     7/1998  Ota et al. .................... 369/219
5,886,977 A *   3/1999  Ota et al. .................... 720/665

* cited by examiner

*Primary Examiner*—Allen Cao
(74) *Attorney, Agent, or Firm*—Joseph S. Tripoli; Harvey D. Fried; Patricia A. Verlangieri

(57) ABSTRACT

The invention relates to a drive system for a scanning device of an information recording or reproduction device, with a carriage coupled to a toothed rack, a gear wheel mechanism driving the toothed rack and a gear housing. It achieves the object of designing a drive system of this type alternatively and in such a way that it ensures a high speed and positioning accuracy of the carriage. For this purpose, the gear wheel mechanism is secured on a supporting element and the gear housing, the gear housing consisting of a dimensionally stable material and being pivotable with the gear wheel mechanism about a spindle which is arranged perpendicularly with respect to the toothed rack.

10 Claims, 4 Drawing Sheets

DRIVE SYSTEM FOR A SCANNING DEVICE OF AN INFORMATION RECORDING OR REPRODUCTION DEVICE

FIELD OF THE INVENTION

The invention relates to a drive system for a scanning device of an information recording or reproduction device, in which the scanning device reads or stores information or data in one or more tracks of a recording carrier. The recording carrier may in this case be a compact disc, known as a CD, a digital versatile disc, known as a DVD, a CD ROM or DVD ROM or a re-writable CD or DVD, or else a magnetooptical or other recording carrier.

BACKGROUND OF THE INVENTION

Devices for recording or reproducing information or data in one or more tracks of a recording carrier which are provided with a scanning device for reading or recording information, referred to as a "pickup", are generally known. The respective scanning device is usually arranged on a carriage which can move obliquely or perpendicularly with respect to the recording track. To achieve a high speed and positioning accuracy, combined with a short access time to different locations of the recording carrier, this carriage is coupled to a toothed rack, which is driven by an electric motor via a gear mechanism. The output shaft of the electric motor is provided for this purpose with a pinion or with a worm wheel, which is in engagement with the gear mechanism. In order to prevent positional changes of the carriage, and consequently of the scanning device, when the drive is switched off or the electric motor is switched off, the gear mechanism is of a self-locking type of design. To meet the requirement for high positioning accuracy and short access time, a gear mechanism with a high transmission ratio is used. The toothed rack arrangement and the gear wheel driving the toothed rack are preferably formed with straight teeth, in order to avoid deflections of the scanning device in the direction of the recording carrier, such as the focusing direction in the case of an optical recording carrier, during tracking or track skipping and when reversing the driving direction.

To reduce gear noises and to improve the tracking behavior of the gear mechanism, small gear modules are preferred, the gear elements of which must have high precision and the production of which requires great care. Generally, gear mechanisms are also greased, in order to avoid running noises. However, the use of lubricating grease for noise reduction entails the risk of the other components of the scanning device, especially the optical components, being soiled by the lubricating grease, whereby the functional capability of the scanning device is impaired. Therefore, the respective gear mechanism is usually accommodated in a housing, which may at the same time advantageously bring about a further reduction in noise.

It is further known to use a flexible toothed rack or else an additional toothed rack on the scanning device side to minimize gear play. Similarly it is known to use coupling systems or flexible gear shafts or spindles or else flexible gear housings on the drive side, in order to protect the gear mechanism from mechanical damage. However, flexible gear shafts and/or flexible gear housings are problematical with regard to the accuracy of the system, because the gear wheel engagement is not optimal under normal circumstances and a flexible gear shaft or gear wheel shaft may bend under operational loading, to the detriment of accuracy. Additional elements in the drive system for the scanning device increase the diversity of the components, the care required and the effort involved in the assembly process, and consequently the production costs.

SUMMARY OF THE INVENTION

It is therefore an aspect of the invention to design the drive system for a scanning device of an information recording or reproduction device according to the preamble of claim 1 alternatively in such a way that it ensures a high speed and positioning accuracy of the carriage along with low noise development and simple assembly.

This is achieved in the case of a drive system according to the preamble of claim 1 by the defining features of the latter. Advantageous refinements are presented in the subclaims.

The invention consists in that the gear wheel mechanism of a drive system for a scanning device of an information recording or reproduction device which is in engagement with a toothed rack coupled to a carriage is secured on a supporting element and a dimensionally stable gear housing. In this case, the gear housing is pivotable to a predetermined degree together with the gear wheel mechanism about a spindle which is arranged perpendicular to the toothed rack and parallel to the gear spindles. The latter are likewise produced from a solid material and are not flexible. The arrangement and design of the gear housing, in particular of the pivoting spindle, make it possible for said housing to be pivoted together with the gear wheel mechanism as a whole against the toothed rack during the operation of the drive device and always kept in an exact and fixed engagement with the latter, in particular even when there is a reversal of the direction of movement of the drive system. The engagement optimized in this way has the effect of compensating for the play of the gear wheel or of the gear mechanism with respect to the toothed rack, which in turn increases the positioning accuracy of the carriage. The pressure which is thereby exerted on the gear wheel in engagement with the toothed rack, and its shaft or spindle, is also reduced. Furthermore, exact engagement, and the associated optimized running of the gear system, reduces running noises.

The gear housing is formed in such a way that it partly encloses and covers the gear wheel on the toothed rack side, so that undesired impairments of further components of the scanning device associated with lubrication of the gear mechanism are avoided. The drive system can be assembled in a reliable process. Production tolerances are also compensated, so that the risk of damage to the gear mechanism during normal operation is essentially ruled out.

In order that the shaft or spindle of the gear wheel on the toothed rack side can perform a movement corresponding to a pivoting movement of the gear housing, a guiding slot in which the end region of the gear wheel shaft on the supporting element side engages is formed in the supporting element. This guiding slot has a curvature with a radius which corresponds to the distance from the spindle of the gear wheel shaft to the pivoting spindle of the gear housing.

Positioning of the gear housing, and consequently also of the gear mechanism, with respect to the toothed rack is made possible by means of a resilient arm which is formed on the gear housing and, at a distance from the latter, engages in a clearance which is formed in the supporting element and provided with a detent. The detent fixes the arm in a defined position. While the drive device is not in operation, the arm is relaxed.

During operation, the gear mechanism is acted on by a drive torque. As a result, the gear mechanism and the gear housing coupled to it are pivoted about the pivoting spindle, so that the arm fixed by its free end in the supporting element is also pivoted along with it and prestressed as a result. This prestressing in turn causes a torque on the drive housing and the gear mechanism in such a way that the gear wheel on the toothed rack side is pressed against the toothed rack. As a result, an integral toothed rack can be used in an advantageous way.

In a preferred embodiment, the gear housing is connected to the supporting element via connecting means similar to bayonet fasteners. These are arranged and formed in such a way that their closing position, in which the gear housing is connected to the supporting element, is obtained when the arm is in its relaxed position—its position without any prestress. In this case, the connecting means are formed in such a way that they permit a pivoting movement of the gear housing within the predetermined limits without the gear housing being detached from the supporting element. The gear mechanism is self-locking and nevertheless the gear mechanism is protected from mechanical damage by the pivoting movement. The connecting means similar to bayonet fasteners permit considerably easier assembly.

In a preferred embodiment, the gear mechanism is formed by a number of gear wheels, and the pivoting spindle is at the same time the spindle of an intermediate gear wheel included as part of the gear mechanism. The gear wheels may be produced from a flexible plastic and the spindles of the gear wheels are formed by webs of the gear housing.

BRIEF DESCRIPTION OF PREFERRED EMBODIMENTS

The invention is explained below in drawings on the basis of an exemplary embodiment. In the associated drawings.

DETAILED DESCRIPTION OF PREFERRED EMBODIMENTS

Figure 1:
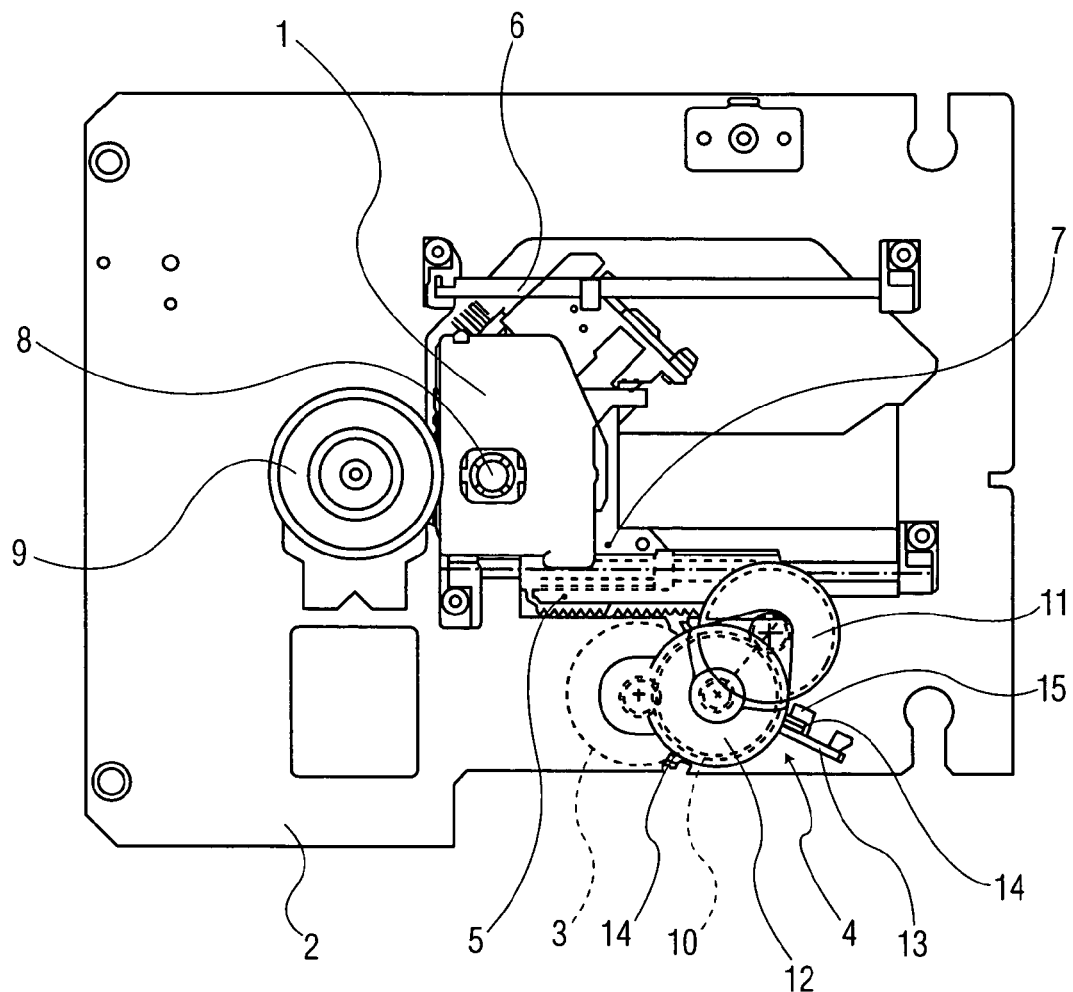
FIG. 1 shows a plan view of a scanning device.

The scanning device 1 represented in FIG. 1 is arranged on a supporting plate 2 and coupled to a drive system formed by an electric motor 3, a gear wheel mechanism 4 and a toothed rack 5 in engagement with the latter, the toothed rack 5 being integrally formed and securely connected to a carriage 7 guided on guiding rods 6. The carriage 7 bears the scanning device 1, which is intended for the scanning of optical recording carriers. It has an objective lens 8, which is used for focusing a light beam or laser beam for recording or playing back information or data on a recording carrier (not shown), which is detachably arranged on a turntable 9 by which the recording carrier is set in rotation. The gear wheel mechanism 4 is formed by two straight-toothed gear wheels 10 and 11, which are coupled to a gear housing 12 made of a dimensionally stable plastic, such as for example polypropylene. Integrally formed on the gear housing 12 are an arm 13, which is resilient due to the choice of the plastic, and also three bayonet hooks 14, which engage at clearances 15, 16 arranged in the supporting plate 2 and corresponding to them, the bayonet hooks 14 engaging behind the supporting plate 2 in the region of the clearances 15 in the connection position. The connection position is provided by the arm 13 engaging in the supporting plate 2 at a distance from the gear housing 12 and being relaxed. For the assembly of the gear housing 12, this arm 13 is easily pushed away to the side, in such a way that it is possible both for the latter to be pushed into the clearance 16 and for the bayonet hooks 14 to be pushed through the clearances 15. By removing the pressure from the arm 13, the latter relaxes as a result of its resilient property and turns the gear housing 12, and consequently also the bayonet hooks 14, so that the angled-away ends of the latter go under the supporting plate 2.

Figure 4:
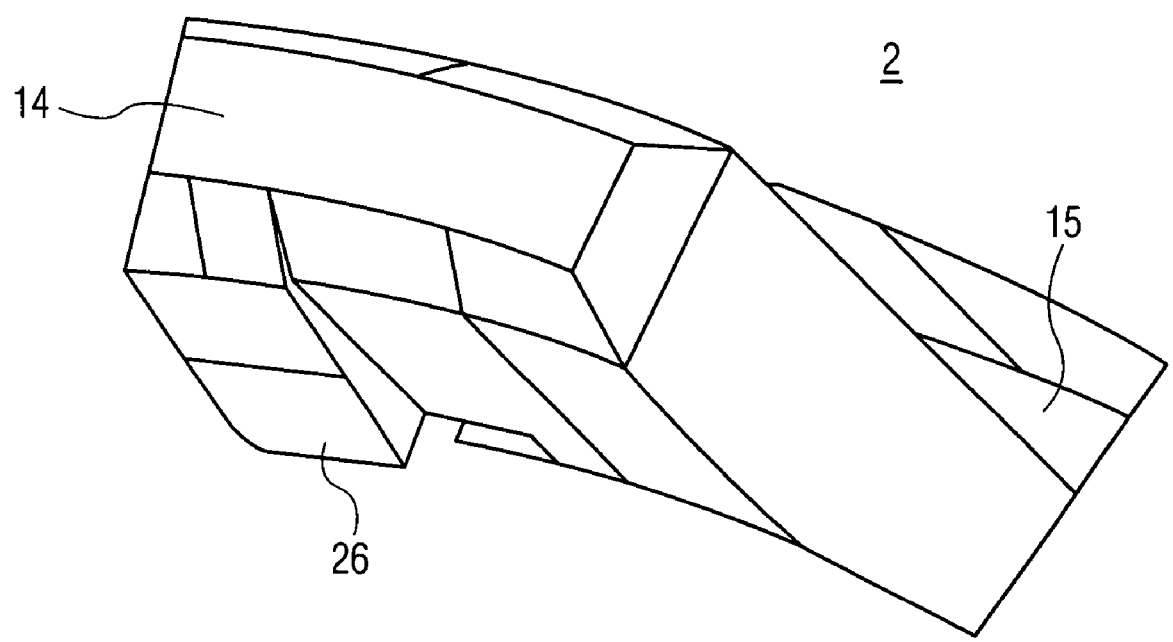
FIG. 4 shows a bayonet hook in engagement with a supporting plate, greatly enlarged.

As an alternative to the embodiment described above, the bayonet hooks 14 may be provided, according to FIG. 4, with a snap projection 26, which is directed radially with respect to the spindle 21 and brings about the assembly-facilitating effect that it engages with the supporting plate or snaps into it already after it has been pushed through the clearance 15, without turning into the connection position taking place. The snap projection represents an additional securement for the connection arrangement between the supporting plate 2, the gear wheel mechanism 4 and the gear housing 12.

Figure 2:
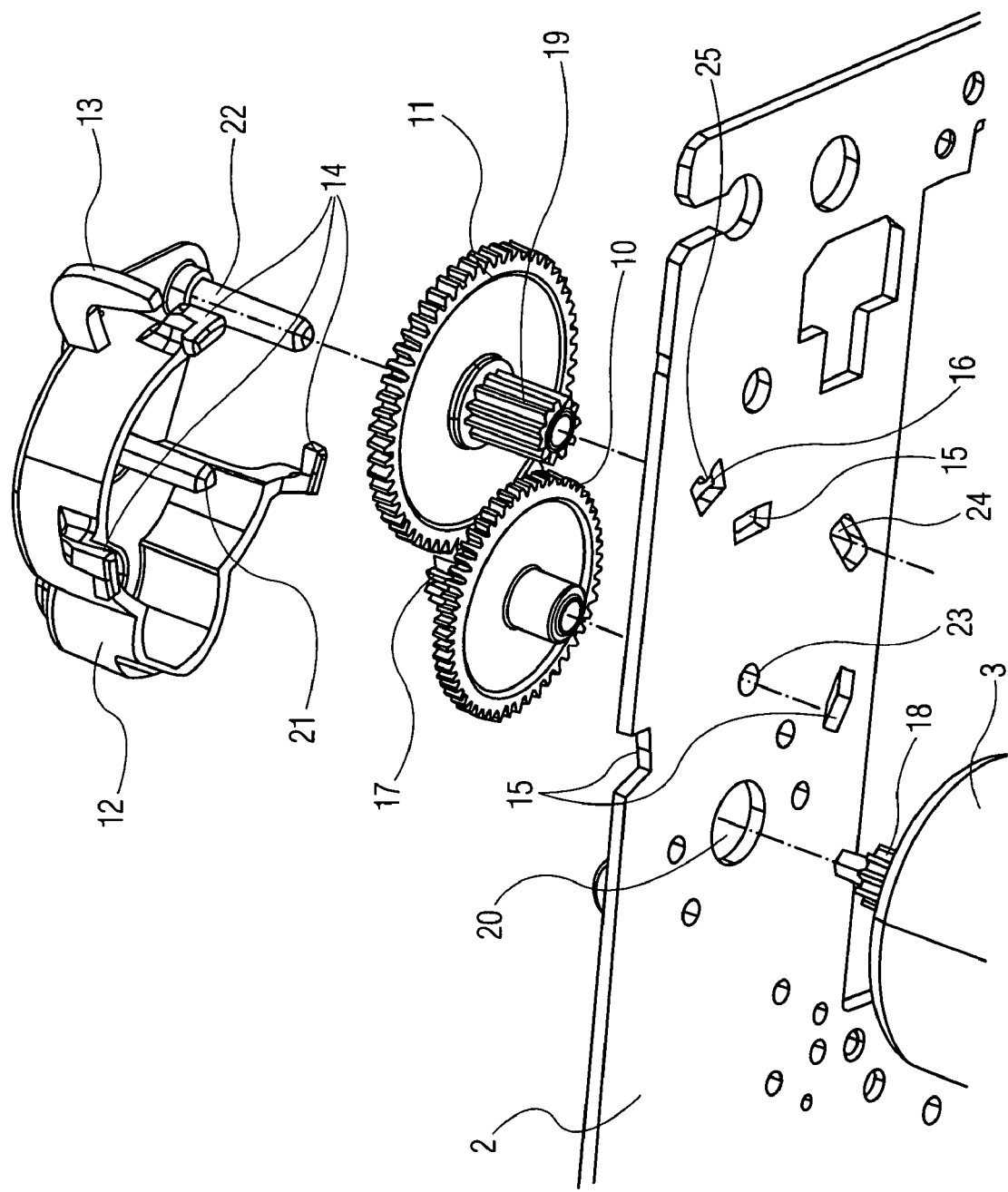
FIG. 2 shows an exploded representation of the gear wheel mechanism coupled to a gear housing.

FIG. 2 shows the arrangement and formation of the gear wheel housing 4 and of the gear housing 12 coupled to the latter. The two straight-toothed gear wheels 10 and 11 are in engagement with each other via a pinion 17, arranged on the gear wheel 10 on the electric motor side, the gear wheel 10 is in engagement with the electric motor 3 via a pinion 18 arranged on the output shaft of the latter and the gear wheel 11 on the toothed rack side is in engagement with the toothed rack 5, not represented in this figure, via a pinion 19 arranged on it. In this case, the output shaft of the electric motor 3 protrudes with the pinion 18 through an opening 20 arranged in the supporting plate 2, from the underside to the upper side of the same, on which the gear wheels 10 and 11 and the gear housing 12 are secured.

Arranged on the gear housing 12 are two spindles 21 and 22 for the gear wheels 10 and 11, which in the assembly position of the gear housing 12 are aligned perpendicularly with respect to the toothed rack 5. The spindle 21 thereby engages with its free end fixedly into a bore 23 formed in the supporting plate 2, and the spindle 22 receiving the gear wheel 11 on the toothed rack side engages in a curved long-hole guide 24, which has a radius of curvature which corresponds to the distance of the two spindles 21 and 22 from each other. The long-hole guide 24 permits a pivoting movement of the gear housing 12 and consequently of the spindle 22 and of the gear wheel 11 about the fixed spindle 21 and at the same time limits this movement by its length. In this case, the spindle 21 is at the same time the axis of rotation of the gear wheel 10.

Figure 3:
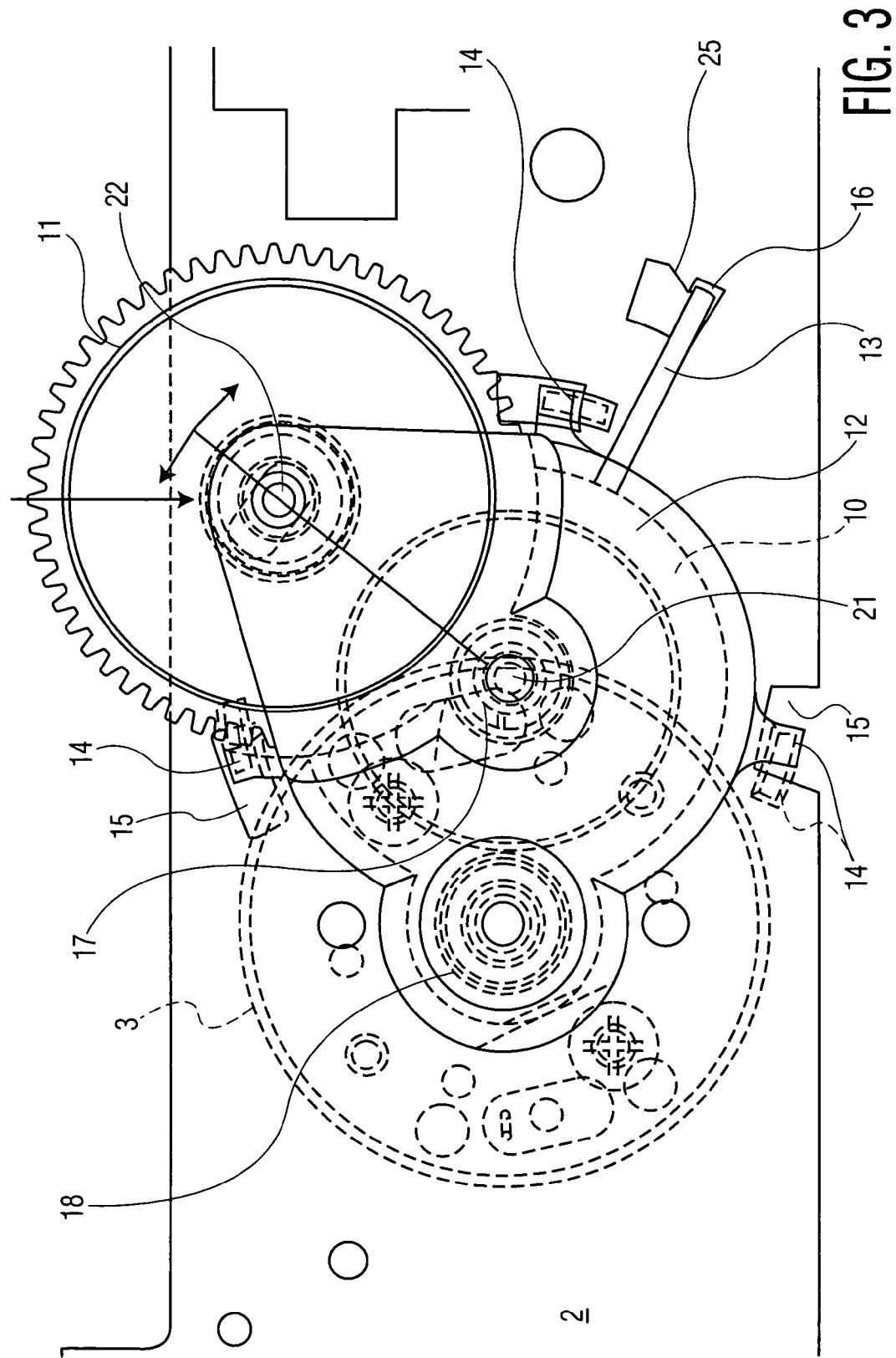
FIG. 3 shows a plan view of this, enlarged.

FIG. 2 also clearly shows the bayonet hooks 14 formed on the gear housing 12 and the clearances 15 provided for them in the supporting plate 2. Also represented are the arm 13 and the clearance 16 provided for it. Formed in the latter is a detent 25, by which the arm 13 is fixed in a defined engagement position. This corresponds on the unactuated gear wheel mechanism 4 to the closed position of the bayonet hooks 14 and a relaxed arm 13. The gear housing 12 and the gear wheels 10 and 11 can only be disassembled by detaching the arm 13 from the clearance 16 while overcoming the detent 25. In FIG. 3, the gear wheel—and gear housing arrangement—are illustrated in an enlarged representation.

The drive system is assembled by firstly screwing the electric motor 3 in its predetermined position onto the underside of the supporting plate 2, whereby it protrudes through the supporting plate 2 with the pinion 18 arranged on its output shaft. Subsequently, the two gear wheels 10 and 11 are pushed onto the spindles 21 and 22 in the gear housing 12 and pre-assembled in this way, the pinion 17 arranged on the gear wheel 10 coming into engagement with the gear wheel 11. After that, this preassembly unit is mounted in a simple way onto the supporting plate 2, by the bayonet hooks 14 and the free end of the arm 13 being inserted into the clearances 15 and 16 provided for them, the arm 13 or its free end having to be pressed to the side and stressed, in order to be able to snap into the clearance 16. As this happens, the pinion 18 comes into engagement with the gear wheel 10 and the pinion 19 comes into engagement with the toothed rack 5. The gear housing 12 is firmly pressed onto the supporting plate, whereby the angled portions of the bayonet hooks 14 go under the supporting plate 2 and, when the arm 13 is relaxed, are turned into their closed position, in which they can slide on the supporting plate 2 within the limits of the extent of the long-hole guide 24 for the spindle 22. Disassembly of the drive system takes place in a simple way, by the gear housing 12 being turned into the insertion position for the bayonet hooks 14 in the clearances 15 and pulled away from the supporting plate 2, so that the bayonet hooks 14 and the free end of the arm 13 disengage from the clearances 15 and 16.

The gear wheel 11, which is pivotable about the spindle 21 within the limits of the extent of the long-hole guide 24, is in an exact and fixed engagement with the toothed rack 5, the gear housing 12 with the spindle 21 being prepositioned by the arm 13. A change in the direction of rotation of the gear wheel mechanism caused by a controlled reversal of the drive direction of the electric motor 3, associated with a reversal of the torque, is taken up by the gear housing 12, which is pivotable about the spindle 21, and the prestressable arm 13, and play occurring between the gear wheel 11 and the toothed rack 5 is compensated. The gear wheel 11 on the toothed rack side is pressed against the toothed rack 5 independently of the direction of rotation of the electric motor 3, so that, by contrast with toothed racks complexly braced against one another, an integral toothed rack 5 is used and can be used. On the other hand, the gear mechanism is protected from mechanical damage by the resiliently supported pivotability of the gear housing 12. The gear housing 12, fastened onto the supporting plate 2 by bayonet hooks 14, has webs which advantageously form the spindles 21 and 22 of the gear wheels 10 and 11 and the gear housing 12 further serves both for noise reduction and for protection of the surroundings from influences of the gear mechanism, if for example it has lubricants.

LIST OF DESIGNATIONS

1 scanning device
2 supporting plate
3 electric motor
4 gear wheel mechanism
5 toothed rack
6 guiding rod
7 carriage
8 objective lens
9 turntable
10 gear wheel
11 gear wheel
12 gear housing
13 arm
14 bayonet hook
15 clearance
16 clearance
17 pinion
18 pinion
19 pinion
20 opening
21 spindle
22 spindle
23 bore
24 long-hole guide
25 detent
26 snap projection

What is claimed is:

1. A drive system for a scanning device of an information recording or reproduction device, with a carriage coupled to a toothed rack, a gear wheel mechanism driving the toothed rack and a gear housing, wherein the gear wheel mechanism is secured on a supporting element and the gear housing, the gear housing consisting of a dimensionally stable material and being pivotable with the gear wheel mechanism about a spindle which is arranged perpendicularly with respect to the toothed rack.

2. A drive system according to claim 1, wherein the spindle of a gear wheel on the toothed rack side of the gear wheel mechanism engages in a guiding slot which is formed in the supporting element and permits a movement of the spindle and of the gear wheel corresponding to the pivoting movement of the gear housing.

3. A drive system according to claim 1, wherein the gear housing has a resilient arm, which at a distance from the gear housing engages in an opening formed in the supporting element and is prestressed when there is a pivoting movement, and wherein a detent, by which the arm is fixed in a defined engagement position, is formed in the opening.

4. A drive system according to claim 1, wherein the gear housing is connected to the supporting element via a connection similar to bayonet fasteners, engaging connecting elements being arranged in such a way that their closing position is obtained in the position of the arm without any prestress.

5. A drive system according to claim 4, wherein the engaging connecting elements are provided with a snap projection, formed transversely with respect to the pivoting direction of the gear housing, for the engagement with the supporting element.

6. A drive system according to claim 1, wherein the pivoting spindle of the gear housing is at the same time the spindle of an intermediate gear wheel included as part of the gear wheel mechanism.

7. A drive system according to either claim 2 or 6, wherein the gear wheel consists of a flexible plastic.

8. A drive system according to claim 1, wherein the spindles of the gear wheel mechanism are formed by webs of the gear housing.

9. A drive system according to claim 2, wherein the gear wheel mechanism is provided such that the gear wheel on the toothed rack side is pressing against the toothed rack independently of its direction of rotation.

10. A drive system according to claim 9, wherein the toothed rack is integrally formed.

* * * * *